(12) United States Patent
Iida

(10) Patent No.: US 8,100,736 B2
(45) Date of Patent: Jan. 24, 2012

(54) SIMULATED ENGINE SOUND DEVICE FOR BICYCLES OR THE LIKE

(75) Inventor: James Iida, Torrance, CA (US)

(73) Assignee: Mattel, Inc., El Segundo, CA (US)

( * ) Notice: Subject to any disclaimer, the term of this patent is extended or adjusted under 35 U.S.C. 154(b) by 199 days.

(21) Appl. No.: 12/455,874

(22) Filed: Jun. 9, 2009

(65) Prior Publication Data

US 2010/0029173 A1 Feb. 4, 2010

Related U.S. Application Data

(60) Provisional application No. 61/131,404, filed on Jun. 9, 2008.

(51) Int. Cl.
*A63H 5/00* (2006.01)

(52) U.S. Cl. .......................... 446/404; 16/421

(58) Field of Classification Search .............. 446/404
See application file for complete search history.

(56) References Cited

U.S. PATENT DOCUMENTS

| | | | |
|---|---|---|---|
| 759,003 A | 5/1904 | McCann | |
| 923,672 A | 6/1909 | Leedy | |
| 1,232,603 A | 7/1917 | Proctor | |
| 1,374,367 A | 4/1921 | Dodd | |
| 1,544,728 A | 7/1925 | Diemer | |
| 1,601,721 A | 10/1926 | Colledanchise | |
| 2,041,134 A * | 5/1936 | Kassler | 74/13 |
| 2,697,306 A * | 12/1954 | Muller | 446/440 |
| 3,286,395 A | 11/1966 | Ryan | |
| 3,659,375 A * | 5/1972 | Stubbmann | 446/7 |
| 3,750,520 A * | 8/1973 | Inoue | 84/94.2 |
| 3,875,696 A | 4/1975 | Howland | |
| 3,938,395 A | 2/1976 | Henecke | |
| 4,055,914 A * | 11/1977 | Ieda et al. | 446/420 |
| 4,174,588 A | 11/1979 | Clanton | |
| 4,272,909 A | 6/1981 | Tsui | |
| 4,280,300 A * | 7/1981 | Kulesza et al. | 446/414 |
| 4,531,751 A * | 7/1985 | Todokoro | 280/828 |
| 4,875,885 A | 10/1989 | Johnson | |
| 5,505,493 A | 4/1996 | Camfield et al. | |
| 6,331,089 B1 | 12/2001 | Iteya | |
| 6,565,107 B1 | 5/2003 | Hartman | |
| 2002/0189524 A1* | 12/2002 | Chen | 116/28.1 |
| 2003/0071437 A1* | 4/2003 | Takeda | 280/260 |
| 2005/0029766 A1 | 2/2005 | Ierfone et al. | |
| 2006/0160464 A1* | 7/2006 | Vetuskey | 446/247 |

FOREIGN PATENT DOCUMENTS

CA 2130226 A1 3/1995

* cited by examiner

*Primary Examiner* — Melba Bumgarner
*Assistant Examiner* — Tramar Harper
(74) *Attorney, Agent, or Firm* — Cantor Colburn LLP

(57) ABSTRACT

A housing supports a rotatable handle grip and is constructed to be received upon the end of a bicycle handlebar in place of a standard hand grip. The housing further supports a dial-type tachometer type readout. A gear drive within the housing responds to movement of the rotatable handle grip to produce tachometer readings. A sound producing device also responds to the handle grip movement to produce engine sounds.

20 Claims, 6 Drawing Sheets

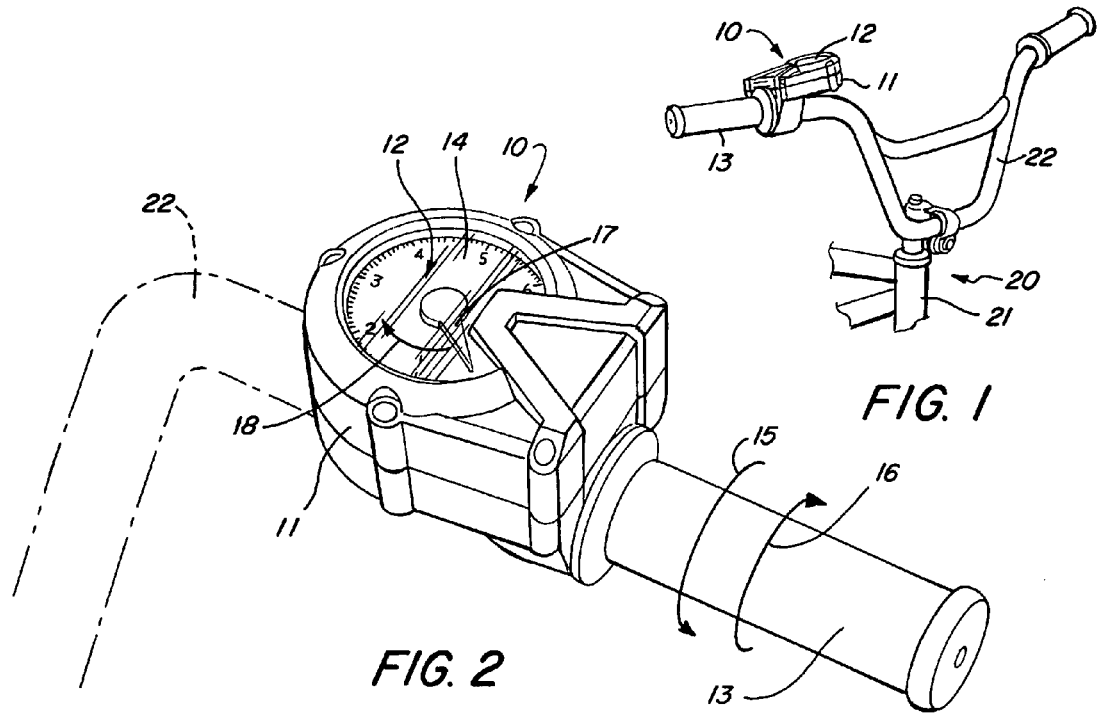
FIG. 1
FIG. 2
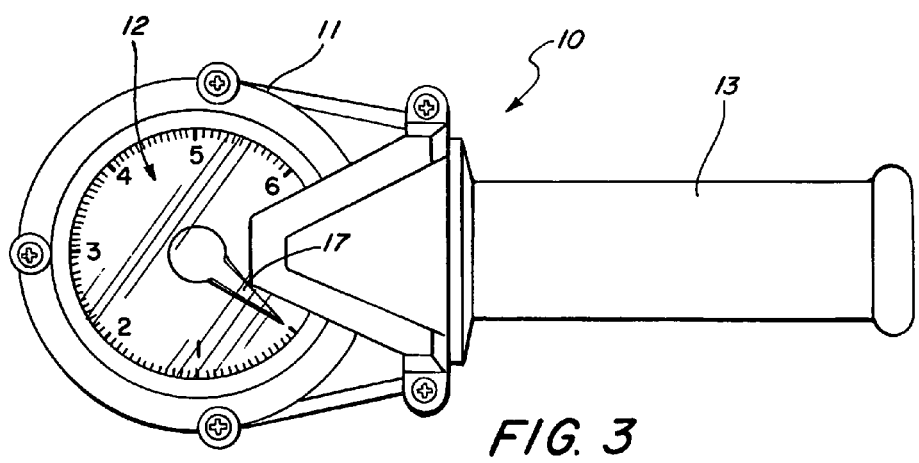
FIG. 3

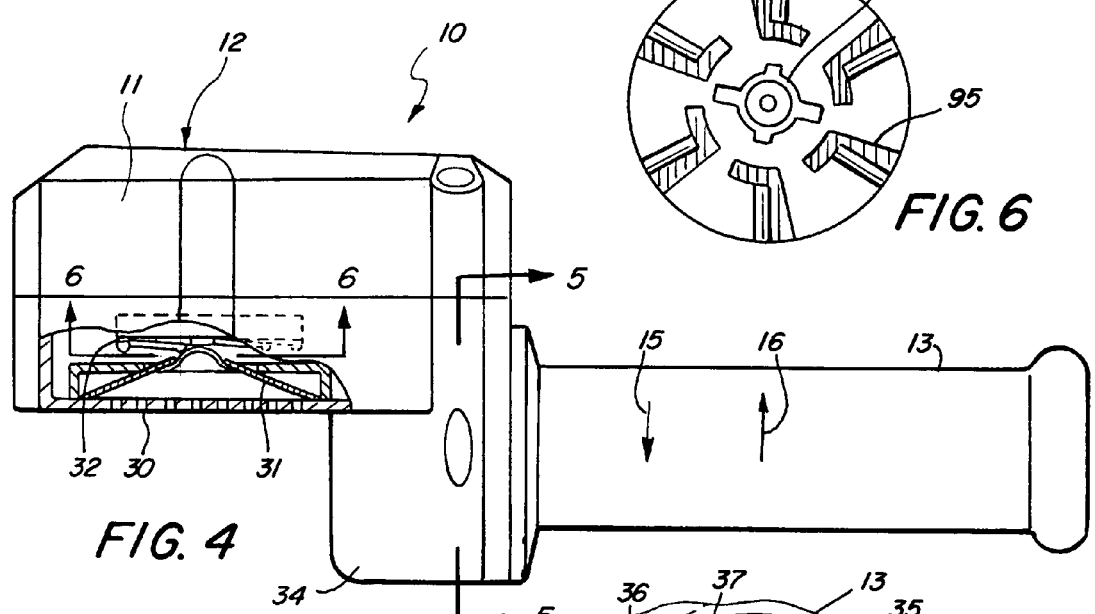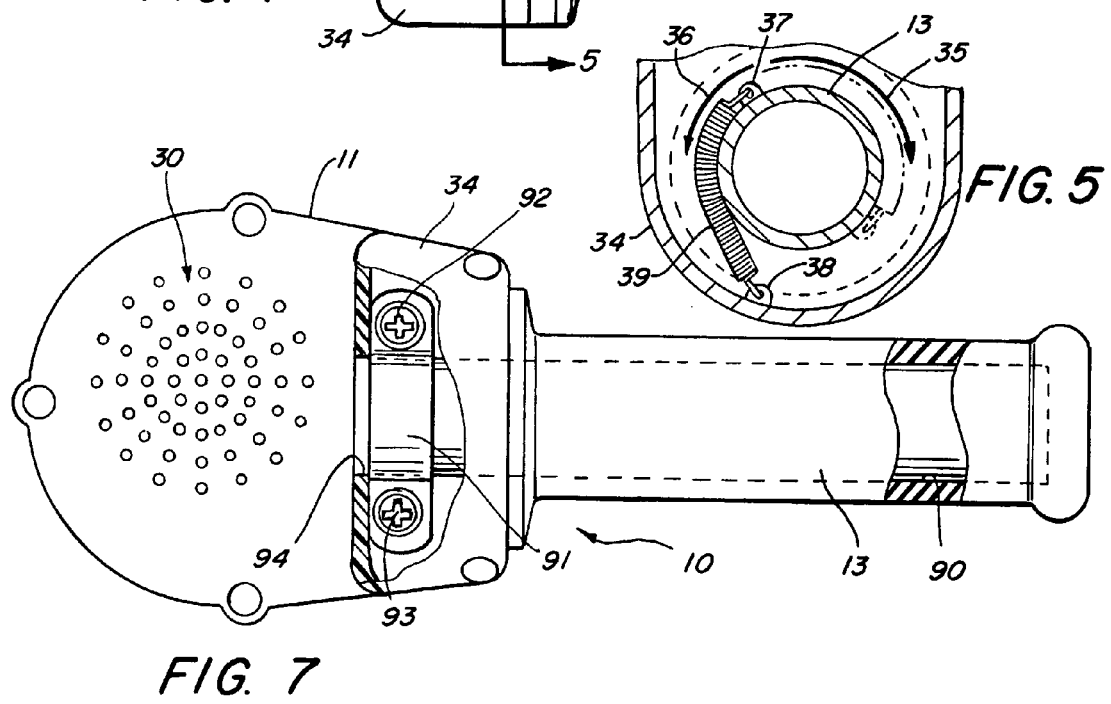

SIMULATED ENGINE SOUND DEVICE FOR BICYCLES OR THE LIKE

CROSS-REFERENCE TO RELATED APPLICATION

This application claims the benefit of and priority under 35 U.S.C. 119(e) of U.S. Provisional Patent Application No. 61/131,404 entitled SIMULATED ENGINE SOUND DEVICE filed Jun. 9, 2008 in the name of James Iida, the disclosure of which is incorporated herein by reference.

FIELD OF THE INVENTION

This invention relates generally to bicycle apparatus and particularly to sound making accessories used therewith.

BACKGROUND OF THE INVENTION

Through the years practitioners in the toy arts have endeavored to provide a variety of add-on accessories to enhance the play value and amusement of toys such as bicycles, scooters and the like. One such variety of accessories may be generally described as so-called "noise making devices" which, as the name implies, function to provide sound accompaniment for operation of the bicycle or similar toy. Perhaps the most common type of sound producing toy used with bicycles or the like is characterized by the production of simulated engine sounds. In responding to the need for such accessories, practitioners in the art have provided a variety of sound producing apparatus.

For example, U.S. Pat. No. 4,055,914 issued to Iida, et al. sets forth a SOUND PRODUCING DEVICE which is adapted to be mounted upon the handlebars of a bicycle and which is capable of producing an engine simulated noise such as that produced by a motorcycle. The device includes a housing together with an elongated handle rotatably mounted therein. The handle drives a transmission system including a striker which cyclically strikes a resonator cone to produce the desired sound. The transmission system also includes a one-way clutch for transmitting rotary movement of the handle to the striker only when the handle is rotated in a first direction.

U.S. Pat. No. 3,875,696 issued to Howland sets forth a TOY DEVICE FOR SIMULATING THE SOUND OF A MOTOR VEHICLE having a rotatable impeller that is engageable with a resonator member for producing the simulated engine sound. The resonator member is pivotally mountable into engagement with the impeller by a remote controlled actuator that simultaneously causes the motor to be energized.

U.S. Pat. No. 4,875,885 issued to Johnson sets forth an ENGINE NOISE SIMULATING DEVICE FOR A BICYCLE having a housing supported upon a shoulder and further supporting a resonator plate all of which is biased by a compressed spring. A resonator chamber extends from the shoulder away from the housing. A camming mechanism raises the resonator plate above the shoulder and releases is as it passes causing the resonator plate to move back against the shoulder under the spring influence and thereby produce an air compression induced sound.

U.S. Pat. No. 3,386,395 issued to Ryan sets forth a DEVICE FOR SIMULATING MOTOR SOUNDS having a lever action drive mechanism which is coupled to a mechanical sounding device by a plurality of speed control gears.

U.S. Pat. No. 6,565,107 issued to Hartman sets forth a MOTORBIKE SOUND SIMULATOR having an elongated flexible resilient member secured to the front fork of a bicycle by a strap and clamp mechanism. The elongated member extends into the travel path of the bicycle wheel spokes and is caused to flap against the spokes as the wheel is rotated thereby producing a sound suggestive of a motorcycle engine.

U.S. Published Application 2005/0029766 filed on behalf of Ierfone, et al. sets forth a SOUND EMITTING DEVICE supported within a hand grip of a personal transport means. The assembly comprises a package having electronically actuated sound generating apparatus and an electronic circuit to feed the signal to the sound generator. A switch within the unit is activated by the user and the sound emitted from the hand grip is distant from the switch.

U.S. Pat. No. 5,505,493 issued to Camfield, et al. setting forth a BICYCLE WITH SIMULATED MOTORCYCLE PARTS and U.S. Pat. No. 6,331,089 issued to Iteya setting forth a MOUNTING DEVICE FOR BICYCLE COMPONENT are illustrative of related simulated apparatus used to configure a bicycle in resemblance of a motorcycle.

U.S. Pat. No. 3,938,395 issued to Henecke, sets forth a BICYCLE SPEEDOMETER TIRE DRIVE GEAR ADAPTER ASSEMBLY which provides a cable drive speedometer for use on a bicycle.

U.S. Pat. No. 4,531,751 issued to Todokoro sets forth a TOY MOTORCYCLE while Canadian Patent 2,130,226 sets forth a HANDLEBAR END BELL both of which show further variation of bicycle apparatus.

A number of early patents set forth noise making apparatus which generally operate in a mechanical manner to produce sound and thus are generally related to the present invention. These prior art patents includes U.S. Pat. No. 759,003 issued to McCann; U.S. Pat. No. 923,672 issued to Leedy; U.S. Pat. No. 1,232,603 issued to Proctor; U.S. Pat. No. 1,374,367 issued to Dodd; U.S. Pat. No. 1,544,728 issued to Diemer and U.S. Pat. No. 1,601,721 issued to Colledanchise.

U.S. Pat. No. 4,272,909 issued to Tsui sets forth a TOY MEDICAL MONITOR KIT while U.S. Pat. No. 4,174,588 issued to Clanton sets forth a TOY BLOOD PRESSURE MONITORING DEVICE both of which are generally related to the present invention.

While the foregoing described prior art devices have, to some extent improved the art and in some instances enjoyed commercial success, there remains nonetheless a continuing need in the art for evermore improved realistic and amusing simulated engine sound devices for use on bicycles or the like.

SUMMARY OF THE INVENTION

Accordingly, it is a general object of the present invention to provide an improved accessory for use on a bicycle or the like. It is a more particular object of the present invention to provide an improved apparatus for use on a bicycle or the like which provides simulated engine sound and realistic operation by the user.

In accordance with the present invention, there is provided a simulated engine sound device including a housing having an upper face upon which a simulated tachometer dial and movable tachometer needle are supported. The housing further includes a handle grip which is rotatable about its major axis similar to the throttle control on a conventional motorcycle. A handlebar receiving passage extends through the lower portion of the housing and passes into the handlebar grip. The grip is rotatable about its major axis in a manner which, as mentioned above, generally resembles the throttle for a conventional motorcycle. Apparatus within the housing responds to "open throttle" handle rotation and return motion of the grip to produce engine sound and to move the simulated tachometer needle upwardly on its scale to indicate an engine RPM increase. A spring mechanism operative upon the grip and supported within the housing functions to provide a return force active upon the grip to restore normal rotational position for the grip. The return movement of the handle allows the tachometer needle to descend to idle position.

The present invention further provides for use in combination with a handlebar, a simulated engine sound device comprises a housing having attachment means for securing the housing to a handlebar; a simulated tachometer supported upon the housing and having a simulated engine speed indicator; a handle grip, coupled to the housing, rotatable between first and second positions upon a handlebar; engine sound means within the housing for producing simulated engine sounds; and operative means responsive to movement of the handle grip to cause the engine sound means to cause the engine sound means to produce engine sounds and to cause the simulated engine speed indicator to indicated engine speeds.

The present invention also provides for use in combination with a bicycle handlebar end, a simulated engine sound device comprises a housing having an aperture for receiving a handlebar end; a handle grip rotatably coupled to the housing having a bore aligned with the aperture for receiving a handlebar end; a clamp coupled to the housing for attachment to a handlebar end; a tachometer read out supported by the housing having an arcuate scale engine speed scale and a pivoting tachometer needle; an engine sound producer for producing simulated engine sounds supported within the housing; and means coupled to the handle grip for moving the tachometer needle and activating the engine sound producer in response to movement of the handle grip.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a partial perspective view of a typical host bicycle having the present invention simulated engine sound device supported on the handlebar thereof;

FIG. 2 sets forth a perspective view of the present invention simulated engine sound device with a handlebar portion shown in phantom line depiction;

FIG. 3 sets forth a top view of the present invention simulated engine sound device;

FIG. 4 sets forth a partial section side elevation view of the present invention simulated engine sound device;

FIG. 5 sets forth a partial section view of the present invention simulated engine sound device taken along section lines 5-5 in FIG. 4;

FIG. 6 sets forth a partial section view of the noise making rotor of the present invention simulated engine sound device taken along section lines 6-6 in FIG. 4;

FIG. 7 sets forth bottom view of the present invention simulated engine sound device;

DESCRIPTION OF THE PREFERRED EMBODIMENT

Figure 8:
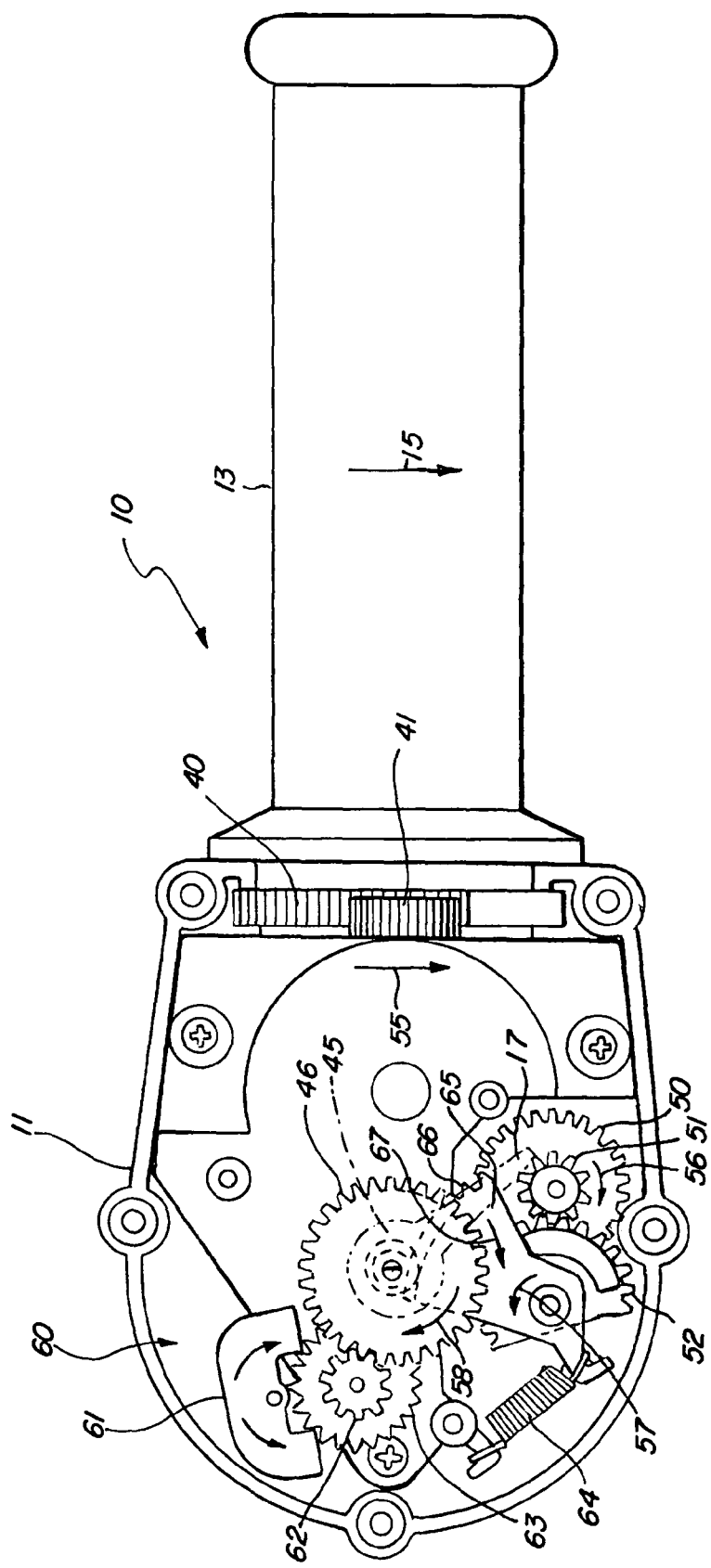
FIGS. 8, 9 and 10 set forth sequential section views of the operational mechanism within the present invention simulated engine sound device generally responsive for tachometer needle movement.

By way of overview, the present invention simulated engine sound device includes a housing receivable upon and supportable by a handlebar end of a conventional bicycle handlebar or the like. It will, of course, be apparent that the present invention is equally advantageous on other toys having handlebars such as scooters or the like. The housing of the present invention simulated engine sound device includes a rotatable mechanical noise maker together with a simulated tachometer having an upwardly facing tachometer scale and a movable simulated tachometer needle. The tachometer and noise maker are operatively coupled to a source of rotational drive which in turn is coupled to a rotable hand grip also supported by the housing. The hand grip is operative to replicate the throttle control of a conventional motorcycle. In operation, the user rotates the hand grip in the manner typical of increasing throttle opening to advance the tachometer needle and rotate the mechanical noise maker. The latter produces a simulated engine "roar". Upon the return of the handle grip to its normal rotational position, the noise maker slowly decreases in output and the tachometer needle returns to its normal position. The end result is simulated engine "rev-up" as the throttle grip is advanced and returned.

More specifically, FIG. 1 sets forth a partial perspective view of a host bicycle generally referenced by numeral 20 having a frame 21 supporting a handlebar 22. Bicycle 20 and frame 21 as well as handlebar 22 may be fabricated entirely in accordance with conventional fabrication techniques. In accordance with the present invention, a simulated engine sound device generally referenced by numeral 10 is received upon and supported by one end of handlebar 22 at the position typically occupied by a handle grip. Simulated engine sound device 10 includes a housing 11 which supports a simulated tachometer 12 together with a rotatable grip 13.

FIG. 2 sets forth a perspective view of simulated engine sound device 10 supported upon a typical handlebar end 22 (the latter being shown in phantom line depiction). Simulated engine sound device 10 includes a housing 11 having an upper face 14 upon which a simulated tachometer 12 is depicted. Tachometer 12 includes a movable tachometer needle 17 which simulates tachometer readout as the needle pivots. Device 10 further includes a hand grip 13 rotatably coupled to housing 11 in the manner described below in greater detail. Suffice it to note here that the user is able to grasp grip 13 and rotate it inwardly in the direction indicated by arrow 15 which by means set forth below produces a simulated engine sound "rev-up" and pivots simulated tachometer needle 17 in the direction of arrow 18. When the user relaxes the force upon grip 13, an internal return spring (seen in FIG. 5) returns grip 13 in the direction indicated by arrow 16. Accordingly, the return of grip 13 allows needle 17 to return to the position shown in FIG. 2.

FIG. 3 sets forth a top view of device 10 showing housing 11 which as is described above supports simulated tachometer 12 having face 14 and needle 17. Housing 11 also supports rotatable hand grip 13.

FIG. 4 sets forth a partially sectioned side elevation view of device 10. As described above, device 10 includes a housing 11 supporting a simulated tachometer 12 having a face 14 and a rotatable grip 13. Housing 11 further defines a downwardly extending housing lobe 34 which provides support for rotatable grip 13. Housing 11 further defines a plurality of apertures on the undersurface of the housing which collectively form a grille 30. A sound cone 31 is supported within housing 11 above grille 30. A rotatable rotor 32, which is operative to produce engine sound as grip 13 is moved in the manner shown by arrows 15 and 16, is positioned directly above sound cone 31. The operation of rotor 32 and sound cone 31 is described below in greater detail. Suffice it to note here that the engine sounds produced by rotor 32 are acoustically amplified and deepened by sound cone 31.

FIG. 5 sets forth a partial section view of device 10 taken along section lines 5-5 in FIG. 4. As mentioned above, housing 11 of device 10 includes a housing lobe 34 which supports rotatable grip 13. Grip 13 further includes a spring tab 37. A stationary tab 38 is secured to the interior portion of housing lobe 34 and a return spring 39 is coupled between stationary tab 38 and tab 37. In operation, the user rotates grip 13 in the direction indicated by arrow 35 overcoming the force of spring 39 and storing energy therein. This direction of rotation corresponds to the "open throttle" direction of rotation which motorcycles typically exhibit. Conversely, spring 39 provides a return force operative in the direction indicated by arrow 36 to restore the initial position of grip 13 when the user relaxes tortional force or releases the grip.

FIG. 6 sets forth a partial section view of the sound making apparatus of the present invention taken along section lines 6-6 in FIG. 4. As can be seen, a circular rotor 32 supports a rotatable striker 33 which in turn supports a plurality of striker tynes 95. As rotor 32 is spun by means described below, a striker tynes 95 impact the apex of sound cone 31 to create engine sound. In its preferred fabrication, rotor 32 is formed of a heavy material such as metal to provide a flywheel action when the rotor is spun.

FIG. 7 sets forth a bottom view of device 10 showing the structure of grille 30. As mentioned above, device 10 includes a housing 11 having downwardly extending housing lobe 34 and rotatably supported grip 13. FIG. 7 also shows bore 90 extending through grip 13 and aperture 94 formed in housing lobe 34. Bore 90 and aperture 34 receive the handlebar end of the handlebars of a host bicycle or the like such as handlebar 22 seen in FIG. 1. In addition, a clamp 91 having fasteners 92 and 93 grasps the handlebar to secure device 10 in place. This attachment is required in order to permit the user to rotate grip 13 and to maintain simulated tachometer (seen in FIG. 1) in an upwardly facing orientation. Thus, housing 11 is fixed upon the host handlebar and while grip 13 is rotatable upon it.

FIG. 8 sets forth a partially sectioned top view of simulated engine sound device 10 having simulated tachometer 12 and upper face 14 removed to expose the gear drive mechanism within housing 11. In essence, this drive mechanism is operative to transfer the movement of grip 13 to needle 17 (seen in FIG. 2) and sound rotor 32 (seen in FIG. 6). In the position shown in FIG. 8, device 10 shows the operative mechanism in the position corresponding to a starting position prior to rotation of grip 13. The user initiates the operation of simulated engine sound device 10 by grasping rotatable grip 13 and rotating grip 13 in the direction indicated by arrow 15.

More specifically, device 10 includes a housing 11 rotatably supporting a grip 13. Grip 13 is coupled to a gear segment 40 which in turn is operatively coupled to an engaged gear 41. By means shown below, gear 41 is coupled to a rotatable gear 50 which in turn supports a gear 51. A gear segment 52 is rotatably supported in engagement with gear 51. Gear 52 is operatively joined to a pivotable arm 65 which in turn defines a gear segment 66. A spring 64 is coupled to the remaining end of arm 65 and operates to provide a return force upon arm 65. A gear 45 engages gear segment 66 and is joined to simulated tachometer needle 17 and needle gear 46. An escapement mechanism 60 includes a gear 62 engaging needle gear 46 and an escapement gear 63 which is joined to gear 62 and is rotatable therewith. Escapement mechanism 60 further includes an escapement toggle 61 having opposed ends which engage gear 63 and are toggled as gear 63 rotates.

In operation, the user initiates the operation of device 10 my rotating grip 13 in the direction indicated by arrow 15. This rotation in turn moves segment gear 40 in the direction indicated by arrow 55. The movement of segment gear 40 in turn rotates gear 41 and by the engaging mechanism shown below produces rotation of gear 50 and gear 51 in the direction indicated by arrow 56. The engagement of gear 51 and gear segment 52 together with the attachment between gear segment 52 and arm 65 causes arm 65 to pivot in the direction indicated by arrow 57 overcoming the force of spring 64. The engagement of gear segment 66 and gear 45 produces a corresponding rotation of needle gear 46 in the direction indicated by arrow 58. As gear 46 rotates, needle 17 is pivoted in the direction indicated by arrow 67. By means set forth below in greater detail in FIG. 11, the rotation of gear 46 produces a rotation of sound rotor 32 within housing 11. The operation of escapement mechanism 60 utilizing toggle 61 and gear 63 provides a speed control of the operation of the sound producing apparatus prolonging its free-wheeling spinning function.

Figure 9:
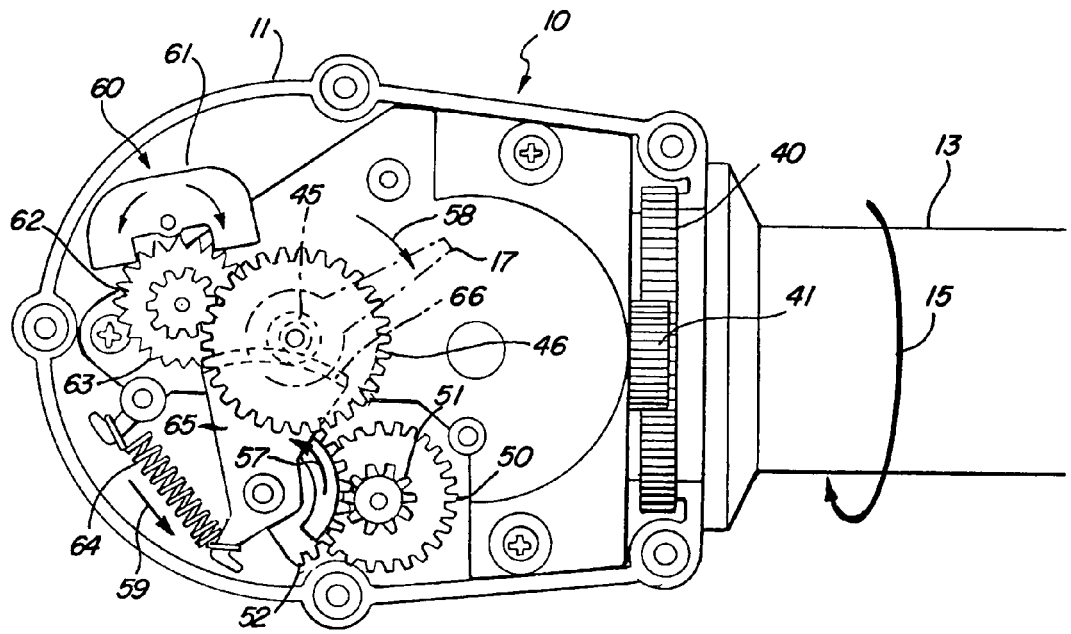

FIG. 9 sets forth a partial section top view of simulated engine sound device 10 at an intermediate position of operation. This intermediate position is created by the continued rotation of grip 13 in the direction indicated by arrow 15. In the intermediate position shown in FIG. 9, the sound producing mechanism simulated tachometer readout is reaching the end of an operational cycle.

More specifically, device 10 includes a housing 11 rotatably supporting a grip 13. Grip 13 is coupled to a gear segment 40 which in turn is operatively coupled to an engaged gear 41. By means shown below, gear 41 is coupled to a rotatable gear 50 which in turn supports a gear 51. A gear segment 52 is rotatably supported in engagement with gear 51. Gear 52 is operatively joined to a pivotable arm 65 which in turn defines a gear segment 66. A spring 64 is coupled to the remaining end of arm 65 and operates to provide a return force upon arm 65. A gear 45 engages gear segment 66 and is joined to simulated tachometer needle 17 and needle gear 46. An escapement mechanism 60 includes a gear 62 engaging needle gear 46. An escapement gear 63 is joined to gear 62 and is rotatable therewith. Escapement mechanism 60 further includes an escapement toggle 61 having opposed ends which engage gear 63.

In operation, as grip 13 has been rotated in the direction indicated by arrow 15, the above described coupling action has produced rotation of arm 65 and gear segment 52 in the direction indicated by arrow 57. The engagement of gear segment 66 and gear 45 causes rotation of gear 45 and tachometer needle 17 in the direction indicated by arrow 58. Correspondingly, the pivotal movement of arm 65 in the direction indicated by arrow 57 overcomes the force of spring 64 extending spring 64 in the direction indicated by arrow 59. Thus, in the position shown in FIG. 9, tachometer needle 17 has been pivoted to a maximum RPM indicating position while escapement mechanism 60 is operative to regulate the rotational speed of sound rotor 32 within the sound producing apparatus supported within housing 11 described below.

Figure 10:
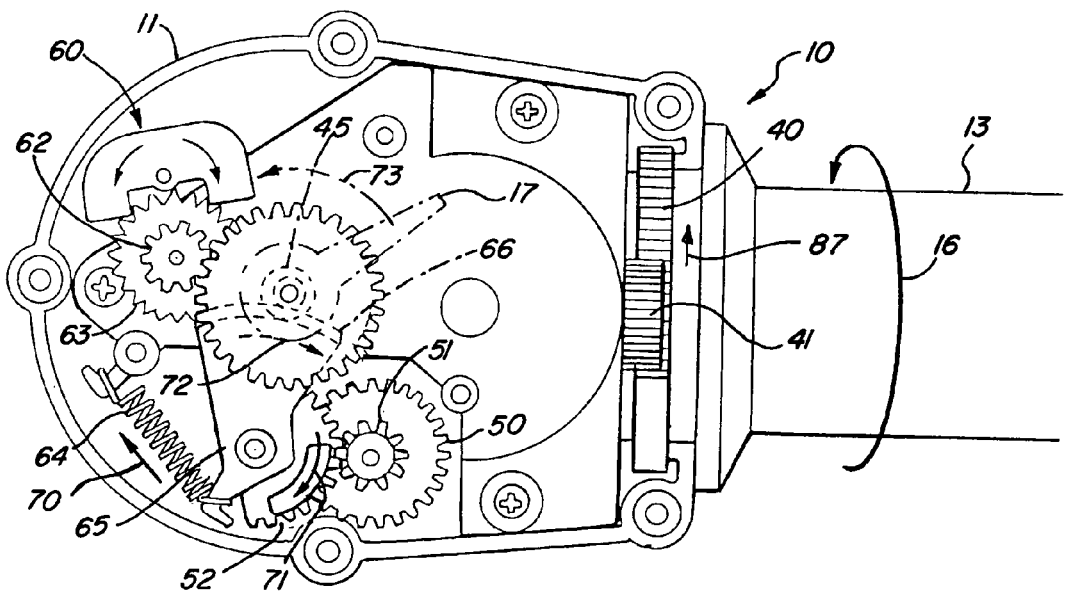

FIG. 10 sets forth a partial section top view of the present invention simulated engine sound device showing the operative mechanism responding to the return rotation of grip 13 in the direction indicated by arrow 16. In essence, the movement depicted in FIG. 10 is the return movement of the mechanism.

More specifically and as is described above, device 10 includes a housing 11 rotatably supporting a grip 13. Grip 13 is coupled to a gear segment 40 which in turn is operatively coupled to an engaged gear 41. By means shown below, gear 41 is coupled to a rotatable gear 50 which in turn supports a gear 51. A gear segment 52 is rotatably supported in engagement with gear 51. Gear 52 is operatively joined to a pivotable arm 65 which in turn defines a gear segment 66. A spring 64 is coupled to the remaining end of arm 65 and operates to provide a return force upon arm 65. A gear 45 engages gear segment 66 and is joined to simulated tachometer needle 17 and needle gear 46. An escapement mechanism 60 includes a gear 62 engaging needle gear 46. An escapement gear 63 is joined to gear 62 and is rotatable therewith. Escapement mechanism 60 further includes an escapement toggle 61 having opposed ends which engage gear 63.

In operation, as grip 13 is rotated in the direction indicated by arrow 16 or is released and allowed to rotate in the direction indicated by arrow 16 under the influence of return spring 39 shown in FIG. 5, a corresponding rotation in the direction indicated by arrow 87 rotates gear 41 to produce rotational force which is coupled by gears 50 and 51 to gear segment 52. The rotation of gears 50 and 51 rotates segment 52 and arm 65 in the direction indicated by arrows 71 and 72. Spring 64 provides a return spring force operative in the direction of arrow 70 which aides the rotation of arm 65 in the direction of arrow 72. As arm 65 rotates in the direction of arrow 72, the coupling of segment 66 to gear 45 provides a corresponding return rotation of needle 17 in the direction indicated by arrow 73. Thus, the operative mechanism within device 10 returns needle 17 to its initial position. Escapement mechanism 60 operates upon the sound producing apparatus to allow the engine sounds to gradually slow and eventually stop.

Figure 11:
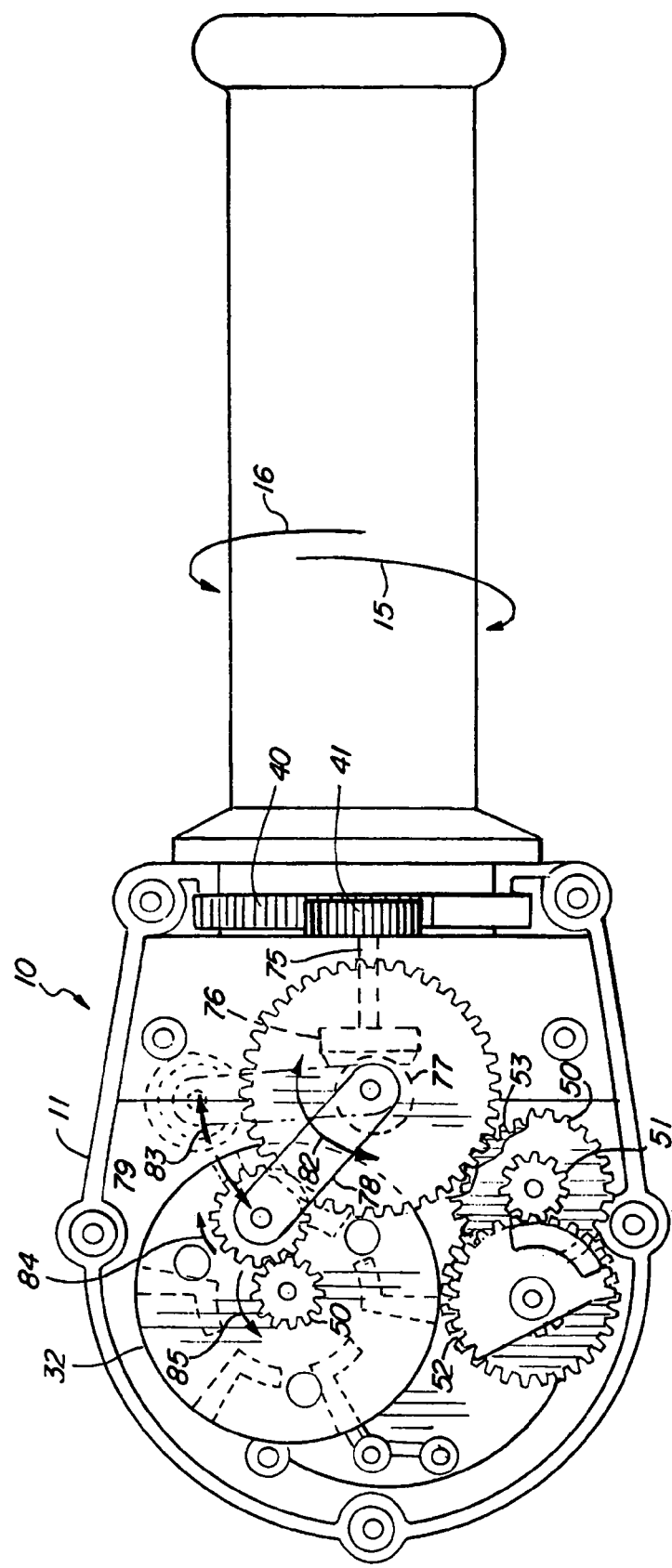
FIG. 11 sets forth a partially sectioned top view of the present invention simulated engine sound device showing the mechanism for coupling and decoupling the noise maker thereof.

FIG. 11 sets forth a partially sectioned top view of simulated engine sound device 10 showing the operative mechanism for creation of engine sound. As is described above, device 10 includes a housing 11 which supports a rotatable hand grip 13 which in turn is operative coupled to a gear segment 40. A gear 41 engages gear segment 40 and is supported by a shaft 75. A bevel gear 76 is supported upon the interior end of shaft 75 and engages a gear 77. Gear 77 is joined to a larger diameter gear 81. A pivot arm 78 is carried by gear 81 and further supports a gear 79 at the movable end thereof. Gear 79 engages gear 81 and is carried by arm 78.

A sound producing rotor 32 and striker 33 (seen in FIG. 6) are rotated to produce engine sound as striker tynes 95 impact sound cone 32 (seen in FIG. 4). Gears 50, 51 and 52 are driven by gear 53 in the manner described above to provide tachometer needle movement.

Arm 78 and gear 81 cooperate to move gear 79 to and from engagement of gear 80 of sound producing rotor 32. Thus, rotation of grip 13 in the direction indicated by arrow 15 produces rotation of gear 41, gears 76 and 77 together with gear 81 to pivot arm 78 in the direction indicated by arrow 83. The movement of arm 78 in the direction of arrow 83 produces gear coupling between gears 81, 79 and 80. As a result, as gear 79 is rotated in the direction indicated by arrow 84, gear 80 together within rotor 32 are rotated in the direction indicated by arrow 85. Conversely, rotation of grip 13 in the direction indicated by arrow 16 produces a pivoting movement of arm 78 in the direction indicated by arrow 88. The movement of arm 78 in the direction indicated by arrow 88 disengages gears 79 and 80. As a result, rotational energy is not coupled to rotor 32 of the sound producing device.

Figure 12:
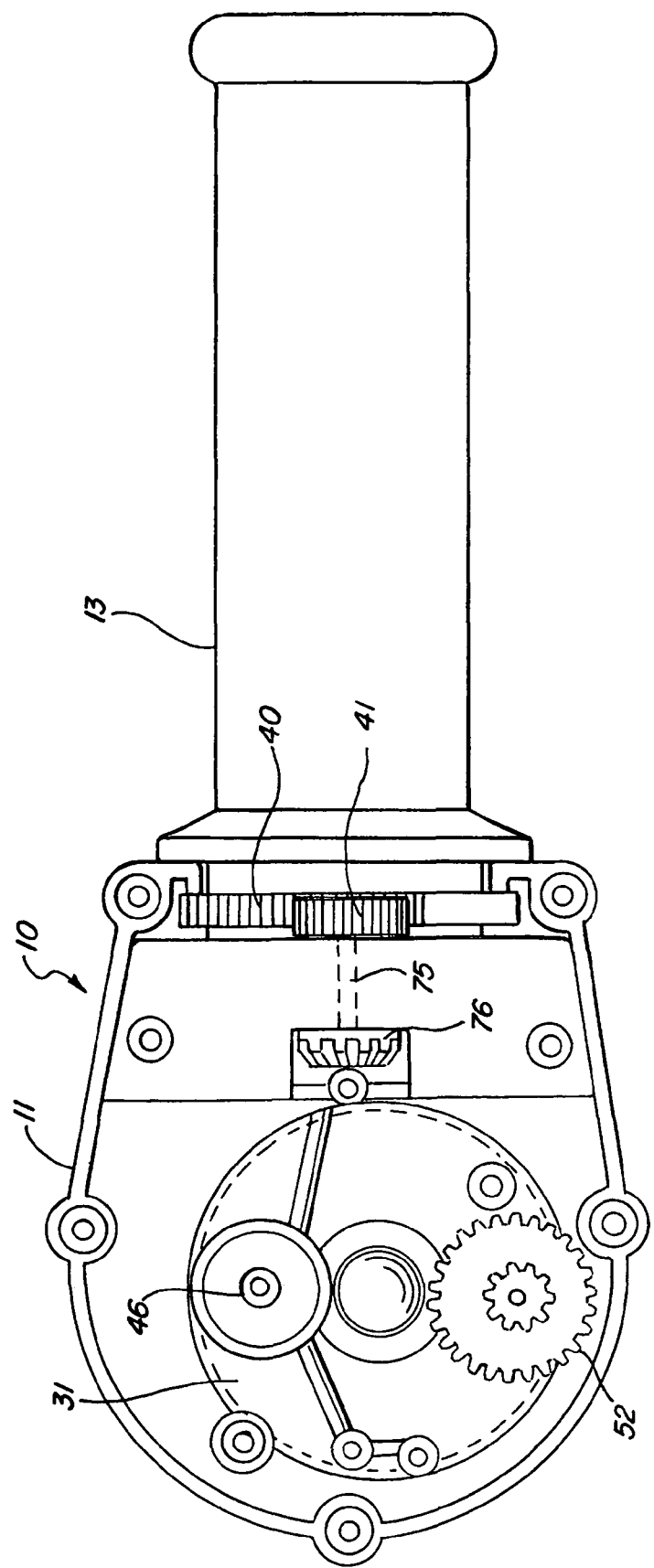
FIG. 12 sets forth a further partial section top view of the present invention simulated engine sound device showing the drive mechanism for the rotatable handgrip.

FIG. 12 sets forth a further partially section top view of simulated engine sound device 10. Of importance to note in FIG. 12 is the extension of shaft 75 between gears 41 and 76. Also of note in FIG. 12 is the position of sound cone 31 within housing 11 which is offset from shaft 46 (the latter supports sound rotor 32 for rotation). This offset brings tynes 95 of rotor 32 (seen in FIG. 6) into impact with sound cone 31.

What has been shown is a simulated engine sound device suitable for use upon the handlebar of a host bicycle, scooter or similar top or sport apparatus. The device shown requires no batteries of electrical power and is operated solely in a mechanical fashion. The device simulates the action of a typical motorcycle throttle control in that rotation of the throttle grip produces tachometer speed indication together with a realistic engine sound. The engine sound decays in a realistic manner when the grip is no longer moved due to the operation of an escapement mechanism.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with a handlebar, a simulated engine sound device comprising:
   a housing having attachment means for securing said housing to a handlebar;
   a simulated tachometer supported upon said housing and having a simulated engine speed indicator;
   a handle grip, coupled to said housing, rotatable between first and second positions upon the handlebar;
   engine sound means within said housing for producing simulated engine sounds; and
   operative means responsive to movement of said handle grip to cause said engine sound means to produce engine sounds and to cause said simulated engine speed indicator to indicate simulated engine speeds.

2. The simulated engine sound device set forth in claim 1 wherein said simulated tachometer includes an upper face and said simulated engine speed indicator includes a pivoting tachometer needle.

3. The simulated engine sound device set forth in claim 2 wherein said engine sound means includes a rotating sound rotor having a plurality of engine sound tynes and an acoustic sound cone positioned to be impacted by said engine sound tynes as said sound rotor is rotated.

4. The simulated engine sound device set forth in claim 3 wherein said handle grip includes an elongated generally cylindrical member defining an internal bore for receiving a handlebar end.

5. The simulated engine sound device set forth in claim 4 wherein said housing includes a clamp for securing said housing to a handlebar.

6. The simulated engine sound device set forth in claim 3 wherein said rotating sound rotor includes a fly-wheel weight to maintain sound rotor spinning.

7. The simulated engine sound device set forth in claim 2 wherein said upper face supports an arcuate engine speed scale and wherein said tachometer needle moves between angular positions upon said scale.

8. The simulated engine sound device set forth in claim 1 wherein said operative means includes a gear sector coupled to said handle grip, a drive gear engaging said gear sector and a plurality of engaged gears coupling said drive gear to said sound means and said simulated tachometer.

9. For use in combination with a bicycle handlebar end, a simulated engine sound device comprising:
- a housing having an aperture for receiving the handlebar end;
- a handle grip rotatably coupled to said housing having a bore aligned with said aperture for receiving the handlebar end;
- a clamp coupled to said housing for attachment to the handlebar end;
- a tachometer read out supported by said housing having an arcuate engine speed scale and a pivoting tachometer needle;
- an engine sound producer for producing simulated engine sounds supported within said housing; and
- means coupled to said handle grip for moving said tachometer needle to indicate simulated engine speeds and activating said engine sound producer in response to movement of said handle grip.

10. The simulated engine sound device set forth in claim 9 wherein said handle grip is spring-biased to a first position and movable to a second position and wherein said engine sound producer produces variable engine speed simulation.

11. The simulated engine sound device set forth in claim 10 wherein said engine sound producer produces increased engine speed sounds in response to handle grip movement from said first position toward said second position and decreased engine speed sounds in response to handle grip movement from said second position toward said first position.

12. The simulated engine sound devices set forth in claim 11 wherein said tachometer needle rest at its low speed position when said handle grip is in said first position and moves toward a higher speed position when said handle is moved from said first position toward said second position.

13. A simulated engine sound producing device, comprising:
- a housing having an aperture for mounting the sound device on an object;
- a handle grip rotatably mounted to the housing for movement between a first position and a second position;
- an engine sound producer located within the housing, the engine sound producer being configured to produce simulated engine sounds when actuated;
- a tachometer needle rotationally mounted to the housing for movement between a first position and a second position to indicate simulated engine speeds; and; and
- wherein rotation of the handle grip from the first position to the second position causes the tachometer needle to move from the first position towards the second position as well as simultaneously actuating the engine sound producer to produce simulated engine sounds and wherein rotation of the handle grip from the second position to the first position causes the tachometer needle to move from the second position towards the first position and rotation of the handle grip from the second position to the first position decouples the handle grip from the engine sound producer.

14. The simulated engine sound producing device as in claim 13, wherein the handle grip is spring biased into the first position.

15. The simulated engine sound producing device as in claim 13, wherein the tachometer needle is spring biased into the first position.

16. The simulated engine sound producing device as in claim 13, wherein the aperture and the housing is configured to be mounted on a handle bar of a bicycle.

17. The simulated engine sound producing device as in claim 16, wherein the handle grip is spring biased into the first position and wherein the tachometer needle is spring biased into the first position.

18. The simulated engine sound producing device as in claim 13, wherein the handle grip is coupled to a first plurality of gears coupled to the tachometer needle and a second plurality of gears coupled the engine sound producer wherein at least one of the second plurality of gears is secured to an arm that pivots between an engaged position and a disengaged position as the handle grip is moved between the first position and the second position, wherein the at least one of the plurality of second gears is decoupled from the engine sound producer when the arm is in the disengaged position.

19. The simulated engine sound producing device as in claim 18, wherein the aperture and the housing is configured to be mounted on a handle bar of a bicycle.

20. The simulated engine sound producing device as in claim 19, wherein the handle grip is spring biased into the first position and wherein the tachometer needle is spring biased into the first position.

* * * * *